United States Patent [19]

Bishop et al.

[11] 4,448,859

[45] May 15, 1984

[54] DEACTIVATION OF THIONYL CHLORIDE CELLS

[75] Inventors: Wayne S. Bishop, Centerville; Richard A. Marsh, Tipp City, both of Ohio

[73] Assignee: The United States of America as represented by the Secretary of the Air Force, Washington, D.C.

[21] Appl. No.: 504,354

[22] Filed: Jun. 14, 1983

[51] Int. Cl.$^3$ .................. H01M 6/50; H01M 6/52
[52] U.S. Cl. ........................... 429/50; 429/101
[58] Field of Search ............ 429/49, 199, 101, 51, 429/52, 103, 194, 196, 48, 50

[56] References Cited

U.S. PATENT DOCUMENTS

| | | | |
|---|---|---|---|
| 4,098,961 | 7/1978 | Sabatino | 429/48 |
| 4,190,704 | 2/1980 | Miles et al. | 429/103 |
| 4,228,229 | 10/1980 | Gabano et al. | 429/196 |
| 4,309,490 | 1/1982 | Chua et al. | 429/101 |
| 4,355,086 | 10/1982 | Saathoff et al. | 429/199 |
| 4,403,021 | 9/1983 | Domeniconi et al. | 429/101 |

*Primary Examiner*—Donald L. Walton
*Assistant Examiner*—Gerard P. Rooney, Jr.
*Attorney, Agent, or Firm*—Donald J. Singer; Charles E. Bricker

[57] ABSTRACT

Thionyl chloride cells are deactivated by introducing a solution of aluminum chloride in thionyl chloride into the cell.

10 Claims, No Drawings

DEACTIVATION OF THIONYL CHLORIDE CELLS

RIGHTS OF THE GOVERNMENT

The invention described herein may be manufactured and used by or for the Government of the United States for all governmental purposes without the payment of any royalty.

BACKGROUND OF THE INVENTION

This invention relates to a primary cell which contains thionyl chloride as at least part of the solvent for the electrolyte and/or as the positive active material. In particular, this invention relates to the deactivation of such cells.

Thionyl chloride cells have a number of advantages over other primary cell systems. The advantages include high energy density, flat discharge characteristics, excellent service over a wide temperature range, and good shelf life. These cells comprise an anodic material, usually lithium or calcium, a positive active material including thionyl chloride and aluminum chloride. Thionyl chloride cells can range in size from relatively small, e.g., "D"-cells, up to relatively large, e.g., about 1 ft$^3$.

It is often desirable, or necessary, to deactivate primary thionyl chloride cells that may contain undischarged anode material, particularly damaged cells or damaged cells in which the anodes have become detached from their terminals. One prior art method for deactivating cells has been to discharge the cell, if possible, then open it and submerge it in water. Following deactivation the water is neutralized. Such a method has certain associated dangers. If the cell is not first discharged, it is inadvisable to submerge it in water. If a large quantity of anode material remains, the deactivation reaction can generate a great deal of heat. Regardless of the amount of anode material remaining, hydrogen gas is generated by the deactivation reaction. The deactivation reaction can form an insoluble product which plugs the spaces in the anode, thus preventing complete deactivation.

Another method for deactivating thionyl chloride cells comprised discharging the cell, if possible, opening the cell and flowing an aqueous gel into the cell. This method was largely unsuccessful.

Other methods for deactivating thionyl chloride cells have been proposed. Such methods generally have one or more drawbacks; they are dependent upon the condition of the cell, they introduce foreign material into the cell that may react in an unpredictable manner, or they produce products which restrict access to the anode and prevent complete reaction.

What is desired is a method for deactivating cells which employ thionyl chloride as the electrolyte solvent and/or cathodic reactant.

Accordingly, it is an object of the present invention to provide a method for deactivating thionyl chloride cells. Other objects and advantages of the present invention will become apparent to those skilled in the art from a reading of the following detailed disclosure and the appended claims.

SUMMARY OF THE INVENTION

In accordance with the present invention there is provided a simple, safe method for deactivating thionyl chloride cells which comprises the steps of electrically discharging the cell, if necessary and, if possible, introducing a solution of AlCl$_3$ dissolved in SOCl$_2$ into the cell, allowing the solution to react with the negative active material in the cell, withdrawing at least a portion of the solution, and repeating the introducing and withdrawing steps, as necessary, until the desired degree of deactivation is achieved.

DETAILED DESCRIPTION OF THE INVENTION

In a thionyl chloride cell using lithium as the anode, the lithium reacts chemically with the thionyl chloride to form lithium chloride, sulfur and sulfur dioxide according to the reaction:

$$4Li + 2SOCl_2 \rightarrow 4LiCl + SO_2 + S \qquad (1)$$

A similar reaction occurs with calcium electrodes. The metal chloride salt forms an insoluble, electrically nonconductive film on the anode which prevents further attack of the anode by the thionyl chloride.

Conventional thionyl chloride cells employ electrolytes containing aluminum chloride and a metal chloride salt corresponding to the metal of the anode in a molar ratio of aluminum chloride:metal chloride of 1:1. Thus, in a primary cell having a lithium anode, the electrolyte comprises lithium aluminum chloride (LiAlCl$_4$). In a primary cell having a calcium anode, the electrolyte comprises calcium aluminum chloride (Ca[AlCl$_4$]$_2$), etc. Other thionyl chloride cells employ electrolytes containing only aluminum chloride or which are rich in aluminum chloride. In general, in conventional thionyl chloride cells, the concentration of the complex metal-aluminum chloride salt is about 1.0–1.5 molar in the thionyl chloride. In other thionyl chloride cells the concentration of the complex metal-aluminum chloride salt is about 0.0–0.5 M and the concentration of aluminum chloride is about 1.0–2.0 M in thionyl chloride.

Various other materials may be employed in thionyl chloride cells, Gabano et al, U.S. Pat. No. 4,228,229, disclose the use of a solute resulting from the reaction of at least one of the following compounds with aluminum chloride: lithium oxide, lithium sulfide, calcium oxide and barium oxide. Chua et al, U.S. Pat. No. 4,309,490 disclose the use of a quantity of sulfur dioxide admixed with the thionyl chloride solvent and lithium aluminum chloride electrolyte salt to regulate the growth of LiCl crystals formed on the lithium anode.

Thionyl chloride cells may be deactivated by introducing a solution of aluminum chloride dissolved in thionyl chloride, allowing the solution to react with the negative active material in the cell, withdrawing at least a portion of the solution, and repeating the introducing and withdrawing steps until the desired degree of deactivation is achieved. Prior to introducing the aluminum chloride/thionyl chloride solution the cell should, if possible, be electrically discharged under controlled conditions.

The thionyl chloride in the deactivating solution reacts with available anode material as given in reaction (1) above. The LiCl formed in this reaction combines with available aluminum chloride according to the reaction $$LiCl + AlCl_3 \rightarrow LiAlCl_4 \qquad (2)$$

A similar reaction occurs with calcium chloride. Dissolution of the protective LiCl or $CaCl_2$ film from the anode exposes fresh Li or Ca to react with the thionyl chloride to form more LiCl or $CaCl_2$. This cycle continues until the anode is consumed or a molar ratio of LiCl or $CaCl_2$ to $AlCl_3$ of 1:1 is achieved. By assuring that excess $AlCl_3$ is always present, anode consumption can be made complete.

The rate of anode consumption can be controlled by controlling the rate at which the deactivating solution is introduced into the cell and/or by controlling the amount of $AlCl_3$ in the deactivating solution. The deactivating solution can be introduced into the cell by injection through the cell casing, circulation of the solution through the cell, or immersion of the cell in the solution. Sealed cells must be punctured or otherwise opened prior to deactivation. Large cells may be deactivated through the normal filling port(s).

The concentration of aluminum chloride in the deactivating solution can range from about 0.05 to 2.0 molar, preferably about 1.0 to 1.5 molar. The rate at which the deactivating solution is introduced into the cell is dependent upon the concentration of aluminum chloride in the solution and the rate of transfer of heat away from the cell. Thionyl chloride has a boiling point of about 78-80 degrees-C. Accordingly, it is desirable to carry out the deactivation at such a rate that the cell temperature does not exceed about 50 degrees-C.

Deactivation of the thionyl chloride cell can be terminated at any point prior to complete deactivation by removing the deactivating solution. Furthermore, deactivation of thionyl chloride cells by the method of this invention does not introduce foreign material into the cell. The present method uses materials which are normally present in thionyl chloride cells. Thus, the cells can be examined for causes of failure without those causes being masked by reaction products produced by the introduction of foreign material.

It will be understood by those skilled in the art that changes in the form and details may be made without departing from the scope and spirit of the invention.

We claim:

1. A method for deactivating a thionyl chloride cell which comprises the steps of:
    (a) electrically discharging that said cell;
    (b) introducing a solution of aluminum chloride dissolved in thionyl chloride into said cell;
    (c) allowing said solution to react with the negative active material in said cell;
    (d) withdrawing at least a portion of said solution from said cell; and
    (e) repeating steps (b), (c) and (d) until the desired degree of deactivation is achieved.

2. The method of claim 1 wherein the concentration of aluminum chloride in said solution ranges from 0.05 to 2.0 molar.

3. The method of claim 1 wherein the concentration of aluminum chloride in said solution is about 1.0 to 1.5 molar.

4. The method of claim 1 wherein said negative active material is lithium.

5. The method of claim 1 wherein said negative active material is calcium.

6. A method for deactivating a thionyl chloride cell which comprises the steps of:
    (a) introducing a solution of aluminum chloride dissolved in thionyl chloride into said cell;
    (b) allowing said solution to react with the negative active material in said cell;
    (c) withdrawing at least a portion of said solution from said cell, and
    (d) repeating steps (a), (b) and (c) until the desired degree of deactivation is achieved.

7. The method of claim 6 wherein the concentration of aluminum chloride in said solution ranges from 0.05 to 2.0 molar.

8. The method of claim 6 wherein the concentration of aluminum chloride in said solution is about 1.0 to 1.5 molar.

9. The method of claim 6 wherein said negative active material is lithium.

10. The method of claim 6 wherein said negative active material is calcium.

* * * * *